United States Patent [19]
Matousek et al.

[11] 3,831,900

[45]* Aug. 27, 1974

[54] VALVE WITH SEALING SEAT ABUTTING A SOFT ANNULAR RING AND STEM

[75] Inventors: Stephen Matousek; Ulrich H. Koch, both of Moraga, Calif.

[73] Assignee: Whitey Research Tool Co., Emeryville, Calif.

[ * ] Notice: The portion of the term of this patent subsequent to Nov. 30, 1988, has been disclaimed.

[22] Filed: Nov. 30, 1971

[21] Appl. No.: 203,320

Related U.S. Application Data

[63] Continuation-in-part of Ser. No. 822,678, May 7, 1969, Pat. No. 3,623,699.

[52] U.S. Cl.............. 251/122, 251/214, 251/357, 251/330
[51] Int. Cl............................................. F16k 47/00
[58] Field of Search .......... 251/122, 214, 357, 333, 251/356, 330

[56] References Cited
UNITED STATES PATENTS

| | | | |
|---|---|---|---|
| 1,084,867 | 1/1914 | Matthews | 251/357 X |
| 1,117,508 | 11/1914 | Lindelsee | 251/357 |
| 1,651,942 | 12/1927 | Belknap | 251/357 |
| 2,311,009 | 2/1943 | Urquhart | 251/357 X |
| 2,646,246 | 7/1953 | Tucci | 251/357 |
| 3,356,335 | 12/1967 | Koch et al. | 251/214 |
| 3,445,088 | 5/1969 | Gallagher et al. | 251/214 |
| 3,467,357 | 9/1969 | Schomer et al. | 251/214 |
| 3,529,805 | 9/1970 | Callahan et al. | 251/214 X |

*Primary Examiner*—Henry T. Klinksiek
*Attorney, Agent, or Firm*—Fay & Sharpe

[57] ABSTRACT

The combination of a valve body with a flow passage therethrough and a stem which projects through an aperture into said passage for sealing against an annular seat therein. An annular recess in the inner end of the stem shaft holds a seal ring under radial compression. A flange intermediate the ends of the stem shaft engages an oppositely directed flange on a telescopingly mounted ferrule, a cylindrical portion of the ferrule projects downwardly over the stem flange and is crimped about the periphery of the annular ring to initiate said compression. A nose portion on the stem shaft projects through the center of the ring and together the shaft flange, nose portion and ferrule portion combine to define said annular recess which is substantially completely filled by the ring. The shaft, ring and ferrule are concentrically mounted and reciprocate as a unit within the valve body between a closed position where the exposed face of the seal ring engages the annular seat and an open position where the seat and ring are spaced apart.

15 Claims, 4 Drawing Figures

3,831,900

VALVE WITH SEALING SEAT ABUTTING A SOFT ANNULAR RING AND STEM

BACKGROUND OF THE INVENTION

This is a continuation-in-part of copending application Ser. No. 822,678, filed May 7, 1969, now U.S. Pat. No. 3,623,699.

Provision of a nose portion on the inner end of a valve stem which serves to regulate or meter the flow of fluids through a valve body is well known. The conventional means of supplying such a nose portion is to machine a recess in the lower end of the stem and to press fit and/or roll the nose portion into the recess.

With this particular manner of assembling there are problems of consistent alignment of the axes of the stem and the nose portion after the press fitting is accomplished. Additionally, the nose portion will not always remain firmly attached to the end of the stem.

Of necessity, the nose portion is of smaller diameter than the flow passage into which it projects. Thus, should the nose portion become loosened in the end of the stem, it could fall out and be carried by fluid flow into other parts of the system. This would obviously be detrimental should the downstream fluid pass through a pump or some other sort of machinery, or the fluid stream branch into a plurality of smaller passages.

Similarly, provision of an annular ring in the lower sealing portion of the stem is common with some valve stems, but usually not in combination with flow regulating type stems. The machining of a second annular recess in the end of the stem which is concentric with the first recess creates other problems. For example, maintaining acceptable tolerances under such circumstances is extremely difficult when both internal and external sidewall or rim thicknesses and the recess depth come under the tolerance limitations.

Provision of a bonnet, a stem packing and a packing nut in combination to isolate the threads on the valve stem from the fluid flow passage is not unknown, but is often important when the fluids passing through the valve could be contaminated by thread lubricants. Arrangement of the packing, bonnet and so on in a manner to seal the stem threads from contact with said fluids is usually so complicated that the expense becomes prohibitive and/or the elements of the structure tend to fail under repeated openings and closings. All of these problems are solved by the herein described valve.

BRIEF DESCRIPTION OF THE INVENTION

A valve body with the usual flow passage between an inlet and an outlet includes a bonnet member connected to the valve body by a union nut. A stem shaft projects through the bonnet into the flow passage and includes a sealing seat on its lower end and an actuating means on its outer end.

Packing is accommodated in the lower end of a counterbore in the bonnet and is placed in compression between the bonnet and the stem by a packing nut having both internal and external threads of identical pitch, the internal threads engage the valve regulating threads on the stem and the external threads engage threads on the inner surface of the bonnet. This being the case, rotation of the packing nut will not affect the setting between the valve stem and the sealing seat. Thus, with the four sets of threads of identical pitch it is possible to tighten the packing nut to stop leaks while maintaining uniform fluid flow through the valve.

A lock nut threaded to the exterior of the bonnet includes a flange which engages a cooperatively formed flange on the exterior of the packing nut. The locking nut, of course, merely holds the packing nut in position after it is appropriately tightened into the bonnet.

The lower end of the stem includes a nose portion projecting downwardly from its lower end and a radially outwardly extending flange above the nose portion. A ferrule member telescopes concentrically over the stem flange and is deformed into compressive engagement with a seal ring which is located immediately below said stem flange. The seal ring in this case is generally rectangular in cross section and, because of the deformed ferrule, is always under compression. The ring substantially fills the recess formed by the nose portion, stem flange and ferrule and is adapted to seal against a shoulder or flat sealing surface within the fluid passage.

PREFERRED EMBODIMENT

Figure 1:
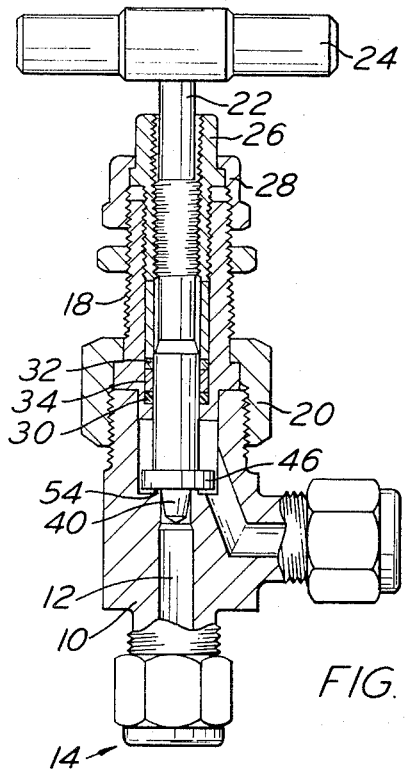
FIG. 1 is a sectional view of the valve of this invention.

FIG. 1 illustrates a sectional view of a valve of this invention and includes a valve body 10 having a passage 12 therethrough extending from an inlet 14 to an outlet 16. In the embodiment illustrated in FIG. 1, the angle pattern arrangement of the valve inlet and outlet are obviously optional features. It will be appreciated by those having ordinary skill in the art that the particular arrangement of the inlet and outlet is purely a matter of choice as are the structural features for connecting the valve to fluid lines.

A bonnet 18 is clamped to the upper portion of the valve body by threaded union nut 20 in conventional manner and a stem shaft 22 projects downwardly from a handle 24 through the bonnet 18 and into the passage 12. Internal and external threads on a packing nut 26, respectively, engage threads on the shaft 22 and the bonnet 18. The internal and external threads on the packing nut 26 are of the same pitch for the reason that leaks occasionally occur between the valve stem and the bonnet while the valve is in operation. When such a leak occurs, it is most often not convenient to close the valve or to adjust the flow characteristics of the fluid flow line. For this reason, the internal and external threads on the packing nut 26 have been designed to allow the packing nut to be tightened, thereby stopping the leak while the operation continues and without any change of the adjustment of the valve stem. This is particularly important with flow regulating type valves as are being described herein.

Most prior art structures which include the double threaded packing nut in similar combinations have not seen fit to provide threads of uniform pitch. Thus, when a leak occurs, the packing nut must be tightened and then the handle adjusted to reinstitute the initially desired fluid flow or non-flow characteristics.

In the illustrative valve, the operation is much more simple. First, the lock nut 28 is loosened slightly. Then the packing nut 26 is tightened. It will be noted that the portion of the packing nut 26 which extends above the locking nut 28 includes tool pads which allow the upper portion of the packing nut to be tightened by wrenches without fully removing the lock nut 28. While the packing nut 26 is being tightened, the other hand of the operator can be on the handle 24 to prevent it from turning with the packing nut. Obviously if the stem 22 does not turn and the pitch of the internal and external threads of the packing nut 26 are identical, there will be no axial movement of the valve stem. Thus, when the leak ceases, the lock nut 28 can simply be tightened down again to hold the packing nut 26 in its proper place and there will be no need to adjust the setting of the valve stem.

The packing of this invention includes two generally rectangular, ceramic filled Teflon seal rings 30 and 32 which sandwich a rectangular, virgin Teflon block 34 between them. It will be understood that when the phrase "Teflon" (a duPont trademark) is used in this context, it is intended to include all useful fluorocarbons, namely polytetrafluoroethylene and polymonochlorotrifluoroethylene, the former being preferred.

Figure 2:
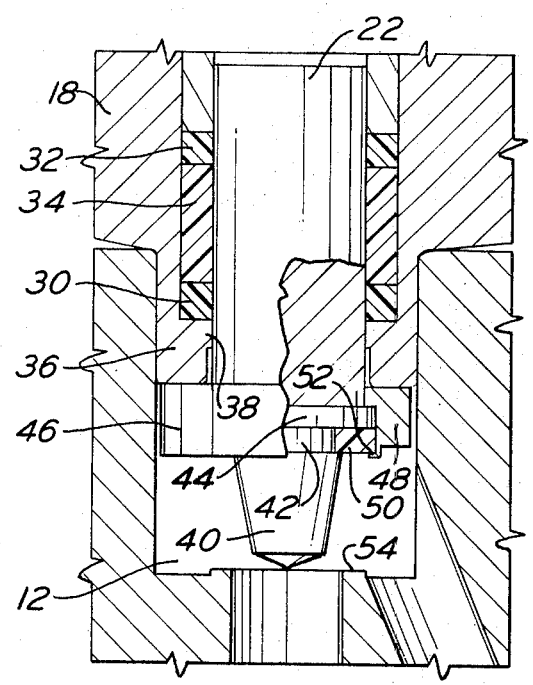
FIG. 2 is an enlarged fragmentary sectional view of the valve of FIG. 1.

Noting particularly FIG. 2, it will be observed that the lower portion 36 of the bonnet extends into the cavity in the upper portion of the valve body 10, thereby providing superior alignment and radial support for the stem. It will be appreciated that in very technically oriented and well regulated fluid systems it is extremely important that the valve stem be properly aligned with the valve seat in the fluid flow passage; otherwise, proper opening and closing of the valve will not occur. When the stem shaft 22 is particularly long as in this particular invention, the problem becomes acute. The long threaded length on the packing nut 26 is a fine assist in helping to align the stem. So also is the packing itself, 30, 32, 34. An additional aligning structure comprises the short flange 38 at the lower portion 36 of the bonnet 18.

It will be observed that the lower portion 36 of the bonnet extension has been counterbored from below such that the flange 38 is of less width than the full extension of the bonnet at that point. The purpose of this feature is to minimize any rubbing and binding of a slightly cocked stem. The flange 38 is designed to surround the stem closely and will serve to guide the stem properly to a great extent. However, should the close surrounding relationship of the flange 38 be extended over the full length of the lower portion 36 of the bonnet, any very slight, relatively negligible misalignment of the stem would cause the stem to bind with the elongated flange 38 at its upper and lower surfaces, thus impairing the easy operability desirable.

Figure 3:
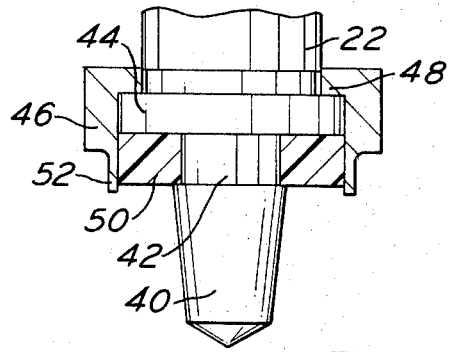
FIG. 3 is an enlarged fragmentary sectional view of the lower end of the valve stem during one stage of the assembly process.

The lower end of the stem includes a nose portion 40 which is formed integrally with the remainder of the stem. In the embodiment of FIGS. 1 through 3, the upper terminus of what is considered the nose portion 40 has been machined to provide a substantially rectangular groove 42, slightly recessed from the maximum outer diameter of the nose portion.

Above the groove 42 is a radially outwardly extending flange 44. A ferrule 46 is concentrically mounted over the stem shaft 22 and includes a radially inwardly extending flange 48 which abuts flange 44. The ferrule 46 is machined to have a cylindrical cavity which telescopes over the flange 44 and a seal ring 50. The ring 50, which is rectangular in cross section, is held in place within the groove 42 and against the underside of flange 44 by a rim portion 52 on the ferrule which is crimped into compressive engagement with its periphery.

During the course of the assembly of the stem shaft 22, ring 50 and ferrule 46, it is important that certain procedures be followed. For example, it is necessary to the proper functioning of the stem for the internal diameter of the seal ring 50 to be smaller than the maximum diameter of the tapered nose 40. However, it is also important that the difference in diameters not be so great as to cause the seal ring to be plastically deformed when it is press fitted over the end of the nose 40. As long as the elastic limit of the ring 50 is not exceeded when it is pressed over the nose 40, it will snap into the groove 42 and be held there in sealing relationship if the proper procedures are followed subsequent to the seal ring mounting.

Next, the ferrule 46 is telescopingly mounted over the flange 44 and the seal ring 50 (see FIG. 3). The lower portion of the rim 52 is spun over at about a 45° angle and then spanked down into compressing sealing engagement with the lower surface of the ring 50. After the assembly is completed, the individual parts are no longer separated but combine to act as a unit.

The angular and dimensional relationships of the rim and ring are more completely set out in the aforementioned copending application and will not be repeated here. However, such dimensional and angular relationships are specifically incorporated herein, incuding the 0.03 inch thickness dimension of the rim 52.

It will be observed in FIGS. 1 and 2 that the sealing seat 54 in the valve body is raised slightly from the adjacent portions of the body. The purpose of this is to have a flat sealing surface which substantially covers all of the exposed surface of the ring 50 when the valve is closed but which does not contact the nose or the crimped rim. The present valve and all its modifications are designed to be operative at pressures up to 5,000 psi. For this reason, it is desirable to minimize the exposure of the ring 50 to the inlet or high pressure side of the valve. One of the important problems in valves of this nature is sealing ring blow out. With pressure of up to 5,000 psi, fluids from the high pressure side of the valve will often migrate behind the seal ring and when the valve is opened, the sudden reduction in pressure will blow the seal out of its recess and often carry it into the fluid system with the resulting detrimental effects to be expected under those circumstances. The raised flat sealing seat 54 helps to minimize the exposure of the seal ring to the high pressure fluids and thus helps to minimize any possibility of blow out.

Another aspect of the structure described and shown which helps to minimize this blow out problem is the compressive forces exerted by the spun over and spanked down rim 52. With proper assembly and spanking operations, the ring 50 will be placed in compression, substantially throughout its thickness and width and will tend to cold flow into any cavities or small recesses not filled by the initial insertion of the ring into position.

It will be appreciated that the groove 42 should not be of any greater width than the thickness of the seal ring 50. Thus, the spanking down of the rim 52 will give a sudden surge of compressive force to the seal ring and force it into any minor recesses or cavities while at the same time forcing it into even greater sealing contact with the upper and lower edges of the groove 42. In this manner, the compressive forces within the confined ring are calculated to exceed the forces exerted on the small area of seal face which is exposed to the high pressure or inlet side of the valve body. Thus, no fluids can migrate behind the ring and cause blow out. All of the embodiments herein described have been tested up to at least 5,000 psi without blow out incident.

It has been found that where the raised seat 54 is of greater thickness than the ring 50, it will tend to cut through over a period of time and scar the internal surface of the cavity housing the ring 50 while at the same time destroying the effective seal. Where the thickness of the ring 50 is approximately twice the thickness of the raised seat 54, and considering the dimensions and materials used, the ring will be sufficiently resilient as not to be cut or deformed appreciably by the raised seat 54. By way of example, one working embodiment includes a seat 54 which is 0.0312 inch high and a ring 44 which is 0.062 inch thick.

The materials suitable for the ring 50 include polytetrafluoroethylene having a specific gravity of at least 2.15, unplasticized polymonochlorotrifluoroethylene, soft metals and rubber having a durometer hardness of at least 90. The fluorocarbons are often porous and this, of course, could allow high pressure fluids to permeate through the ring. For this reason, not all fluorocarbons are susceptible of use in this embodiment. In all the embodiments described herein, the polytetrafluoroethylene should have a specific gravity of at least 2.15, preferably 2.16 to 2.19, and the polymonochlorotrifluoroethylene should be of the unplasticized variety to avoid the porosity problem.

The preferred material for ring 50 in the embodiments described herein is the unplasticized monochlorotrifluoroethylene, sometimes known by the Minnesota Mining trademark Kel-F.

Figure 4:
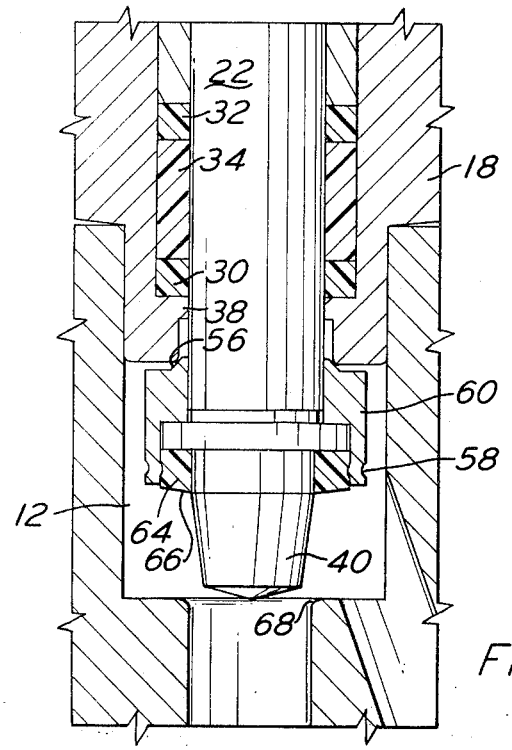
FIG. 4 is a modified embodiment of the invention.

The embodiment illustrated in FIG. 4 differs from the embodiment of FIG. 2 in that it includes a sloped surface 56 on the ferrule which forms a back seat with the lower end of the bonnet 18 to prevent gross leakage should some occasion arise when the packing fails and it is impractical to shut down the fluid flow operation or tighten the packing nut 26. The back seat will serve to minimize leakage until such time as the operation can be shut down and the packing repaired. It will be appreciated that similar back seats could be formed on the embodiment of FIG. 2 if desired.

Other modifications comprise the shape of the ferrule, the shape of the seal ring and the shape of the sealing seat in the flow passage. Instead of the spanked over rim 52 of FIG. 2, the embodiment in FIG. 4 relies on a groove 58 rolled into the outer surface of the ferrule 60 which, in turn, impresses a groove 62 in the surface of the Kel-F ring 64. This deformation tends to build the kind of compression desirable in this type of embodiment to prevent the migration of fluids behind the ring. It will be appreciated that the force generated by the rolling of the groove 58 will put compressive forces on the innermost portions of the ring 64 which exceed the cold flow shear forces of the material under unconfined circumstances. As a result, any small cavities remaining in the recess will immediately thereafter be filled by the cold flow of the material of ring 64. Such cold flow is calculated to minimize voids within the recess which could provide a pocket for migrating fluids.

Additionally, it will be observed that the ring 64 includes a portion projecting beyond the lower edge of the ferrule 60 and the lower surface 66 thereof is sloped downwardly and inwardly. This allows a modified seating surface in the valve body which comprises a rounded edge 68 which is not raised above the surrounding surface. The sloped sealing surface 68 and the inclined face 66 combine to force the ring 64 into more rigid, compact sealing contact with the stem and thereby further help to minimize any fluid migrating behind the ring.

We claim:

1. In the combination of a valve body with passage means between an inlet and an outlet,
    stem means projecting into said body for sealing against an annular seat within said passage,
    an annular recess in the inner end of said stem means containing an annular ring composed of a material selected from the group consisting of polytetrafluoroethylene of a specific gravity not less than 2.15, unplasticized polymonochlorotrifluoroethylene, soft metals and rubber having a durometer hardness of at least 90,
    a nose portion projecting from the inner end of said stem through an opening in the ring,
    said ring substantially completely filling the recess between said nose portion and a rim at the periphery of said recess,
    said rim and nose portion holding the edges of said ring in sealing engagement within the recess,
    with the seat and ring in sealing engagement, the interaction of the holding pressure of the rim and the nose portion and the substantially complete filling of the recess by the ring combining to maintain said substantially fluid tight sealing engagement at the rim and nose portion up to fluid pressures of 5,000 psi, the improvement comprising:
    the stem including two concentrically mounted pieces, (1) a shaft with the nose portion on its lower end and its upper end projecting from the valve body, an outwardly extending flange on said shaft intermediate its ends and (2) a ferrule having an inwardly extending flange abutting the flange on said shaft and a cylindrical portion circumscribing said annular ring, said cylindrical portion comprising said rim,
    the ferrule and the nose portion of said shaft combining to hold the annular ring in constant compression where it contacts the surface of said recess,
    a bonnet attached to the valve body and circumscribing the stem means, packing means in said bonnet for sealing between said stem and bonnet,
    means for adjusting the fluid flow through said valve body, said adjusting means being on said stem means above said packing means and out of contact with fluids passing through said valve body.

2. The combination of claim 1 wherein the adjusting means includes threads on said stem and bonnet.

3. The combination of claim 1 including mating sealing surfaces on the ferrule flange and the lower end of said bonnet for sealing the passage through the bonnet from the flow passage through the valve body.

4. The combination of claim 1 wherein the packing means comprises a ring, said ring being formed of a fluorocarbon material.

5. In the combination of a valve body with passage means between an inlet and an outlet,
stem means projecting into said body for sealing against an annular seat within said passage,
an annular recess in the inner end of said stem means containing an annular ring composed of a material selected from the group consisting of polytetrafluoroethylene of a specific gravity not less than 2.15, unplasticized polymonochlorotrifluoroethylene, soft metals and rubber having a durometer hardness of at least 90,
a nose portion projecting from the inner end of said stem through an opening in the ring,
said ring substantially completely filling the recess between said nose portion and a rim at the periphery of said recess,
the surface of said ring facing said seat being partially covered by said rim and a shoulder on said nose portion,
said rim and shoulder holding the edges of said ring in sealing engagement within the recess,
the seat comprising a raised flat surface for sealing against said ring, said flat surface being of a width to contact substantially all of the exposed surface of said ring and without contacting the rim or the nose portion,
with the seat and ring in sealing engagement, the interaction of the holding pressure of the rim and the shoulder and the substantially complete filling of the recess by the ring combining to maintain said substantially fluid tight sealing engagement at the rim and shoulder up to fluid pressures of 5,000 psi, the improvement comprising:
the stem means including two pieces, the rim being a portion of the first of said pieces, said first piece comprising a ferrule having a radially inwardly extending shoulder portion, a cylindrical portion and a sealing portion, said sealing portion comprising the inner surface of said rim,
the radially inwardly extending shoulder portion of said first piece engaging a cooperating support flange on the second portion of said stem means, said second portion comprising a shaft with said nose portion being on its lower end,
the cylindrical portion of the ferrule extends between its shoulder portion and its sealing portion substantially concentrically with the shaft,
the ferrule sealing portion being formed radially inwardly from the cylindrical portion and into sealing engagement with the lower face of the sealing ring.

6. The combination of claim 5 wherein the rim portion of the ferrule is of less radial thickness than the remainder of the cylindrical portion.

7. The combination of claim 6 wherein the greatest diameter of the nose portion of the shaft is greater than the minimum diameter of the annular ring but less than the diameter at which the elastic limit of said annular ring is exceeded.

8. The combination of claim 5 wherein the greatest diameter of the nose portion of the shaft is greater than the minimum diameter of the annular ring but less than the diameter at which the elastic limit of said annular ring is exceeded.

9. The combination of claim 5 wherein the linear dimension of said ring is greater than the linear dimension of said raised seat, both measured parallel with the shaft axis.

10. The combination of claim 9 wherein said linear dimension of said raised seat is at least about 0.0312 inch.

11. In the combination of a valve body with passage means between an inlet and an outlet,
stem means projecting into said body for sealing against an annular seat within said passage,
an annular recess in the inner end of said stem means containing an annular ring composed of a material selected from the group consisting of polytetrafluoroethylene of a specific gravity not less than 2.15, unplasticized polymonochlorotrifluoroethylene, soft metals and rubber having a durometer hardness of at least 90,
a nose portion projecting from the inner end of said stem through an opening in the ring,
said ring substantially completely filling the recess between said nose portion and a rim at the periphery of said recess,
said rim and nose portion holding the edges of said ring in substantially fluid tight sealing engagement within the recess,
with the seat and ring in sealing engagement, the interaction of the holding pressure of the rim and the nose portion and the substantially complete filling of the recess by the ring combining to maintain said substantially fluid tight sealing engagement at the rim and nose portion up to fluid pressures of 5,000 psi, the improvement comprising:
the stem comprising two pieces; the first piece being a shaft with the nose portion on its lower end and the upper end projecting out of the valve body, a radially outwardly extending flange on said shaft intermediate its ends; the second piece being a ferrule mounted concentrically about said shaft and including a cylindrical rim portion and a radially inwardly extending flange,
the two said flanges being in contact,
the rim portion including a plastically deformed groove in its outer surface,
the lower end of the annular ring projecting below the rim portion and defining a sloping surface converging toward the nose portion,
said annular seat comprising (1) a flat surface substantially parallel with said flanges and (2) a curved surface extending between said flat surface and a portion of said passage means, the minimum diameter of said passage means adjacent said curved surface being greater than the maximum diameter of the nose portion of the stem.

12. The combination of claim 11 wherein the sealing ring above the groove in said ferrule is under compression at all times.

13. The combination of claim 12 wherein the sealing ring is composed of a material selected from the group consisting of polytetrafluoroethylene and polymonochlorotrifluoroethylene and said compression is greater than the elastic limit of said ring.

14. In the combination of a valve body with passage means between an inlet and an outlet,
stem means projecting into said body for sealing against an annular seat within said passage,
an annular recess in the inner end of said stem means containing an annular ring, a nose portion projecting from the inner end of said stem through an opening in the ring, said ring substantially completely filling the recess between said nose portion and a rim at the periphery of said recess, said rim and nose portion holding the edges of said ring in sealing engagement within the recess, with the seat and ring in sealing engagement, the interaction of the holding pressure of the rim and the nose portion and the substantially complete filling of the recess by the ring combining to maintain said substantially fluid tight sealing engagement at the rim and nose portion up to fluid pressures of 5,000 psi, the improvement comprising:

the stem including two concentrically mounted pieces, (1) a shaft with the nose portion on its lower end and its upper end projecting from the valve body, an outwardly extending flange on said shaft intermediate its ends and (2) a ferrule having an inwardly extending flange abutting the flange on said shaft and a cylindrical portion circumscribing said annular ring, said rim comprising part of said cylindrical portion, the ferrule and the nose portion of said shaft combining to hold the annular ring in constant compression where it contacts the surface of said recess, a bonnet attached to the valve body and circumscribing the stem means, packing means in said bonnet for sealing between said stem and bonnet, means for adjusting the fluid flow through said valve body, said adjusting means being on said stem means above said packing means and out of contact with fluids passing through said valve body, said rim portion of the ferrule being of less radial thickness than the remainder of said cylinder portion, the greatest diameter of the nose portion of the shaft being greater than the minimum diameter of the annular ring, but less than the diameter at which the elastic limit of said annular ring is exceeded.

15. The combination of claim 14 wherein the sealing ring is composed of a material selected from the group consisting of polutetrafluoroethylene and polymonochlorotrifluoroethylene and said compression is greater than the elastic limit of said ring.

* * * * *